United States Patent
Lee et al.

(10) Patent No.: US 8,048,586 B2
(45) Date of Patent: Nov. 1, 2011

(54) FUEL CELL STACK STRUCTURE

(75) Inventors: Jae-yong Lee, Seongnam-si (KR); Kyoung-hwan Choi, Suwon-si (KR); Chan-ho Pak, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 367 days.

(21) Appl. No.: 11/928,864

(22) Filed: Oct. 30, 2007

(65) Prior Publication Data

US 2008/0118814 A1    May 22, 2008

(30) Foreign Application Priority Data

Nov. 22, 2006 (KR) .................. 10-2006-0116072

(51) Int. Cl.
H01M 8/04 (2006.01)
H01M 2/14 (2006.01)

(52) U.S. Cl. .................. 429/457; 429/514

(58) Field of Classification Search .......... 429/39, 429/457, 514
See application file for complete search history.

(56) References Cited

U.S. PATENT DOCUMENTS

| | | | | |
|---|---|---|---|---|
| 3,896,076 A | * | 7/1975 | Watanabe et al. | 523/440 |
| 4,761,349 A | * | 8/1988 | McPheeters et al. | 429/456 |
| 5,798,188 A | * | 8/1998 | Mukohyama et al. | 429/480 |
| 6,255,012 B1 | * | 7/2001 | Wilson et al. | 429/514 |
| 2006/0105220 A1 | * | 5/2006 | Shu et al. | 429/34 |
| 2006/0199061 A1 | | 9/2006 | Fiebig et al. | |
| 2006/0210865 A1 | | 9/2006 | Inoue | |

OTHER PUBLICATIONS

Office Action issued in corresponding Korean Patent Application No. 2006-116072 dated Sep. 20, 2007.

* cited by examiner

*Primary Examiner* — Patrick Ryan
*Assistant Examiner* — Brent Thomas
(74) *Attorney, Agent, or Firm* — Lee & Morse, P.C.

(57) ABSTRACT

A fuel cell stack induces smooth current collection and liquid or gas flow without using a heavy bipolar plate. The fuel cell stack includes: a membrane and electrode assembly (MEA) in which an electrolyte membrane is disposed between a cathode electrode and an anode electrode; a current collector disposed in the MEA to form an electrical path with an adjacent MEA; and a non-conductive separation plate disposed between the MEA and the adjacent MEA, the non-conductive separation plate forming flow channels to supply a liquid or gas to the cathode electrode and the anode electrode. A fuel cell stack structure having the above structure is simple and lightweight as the MEA includes a thin and lightweight non-conductive polymer separation plate and a current collector to connect adjacent MEAs.

11 Claims, 7 Drawing Sheets

FUEL CELL STACK STRUCTURE

CROSS-REFERENCE TO RELATED APPLICATION

This application claims the benefit of Korean Application No. 2006-116072, filed on Nov. 22, 2006, in the Korean Intellectual Property Office, the disclosure of which is incorporated herein by reference.

BACKGROUND OF THE INVENTION

1. Field of the Invention

Aspects of the present invention relate to a fuel cell stack structure that is formed by stacking membrane electrode assemblies (MEAs) and flow channel plates, and more particularly, to a fuel cell stack structure in which a flow channel plate, which is also called a bipolar plate, conventionally formed of graphite or a metal can be replaced by a simple separation plate.

2. Description of the Related Art

Figure 1:
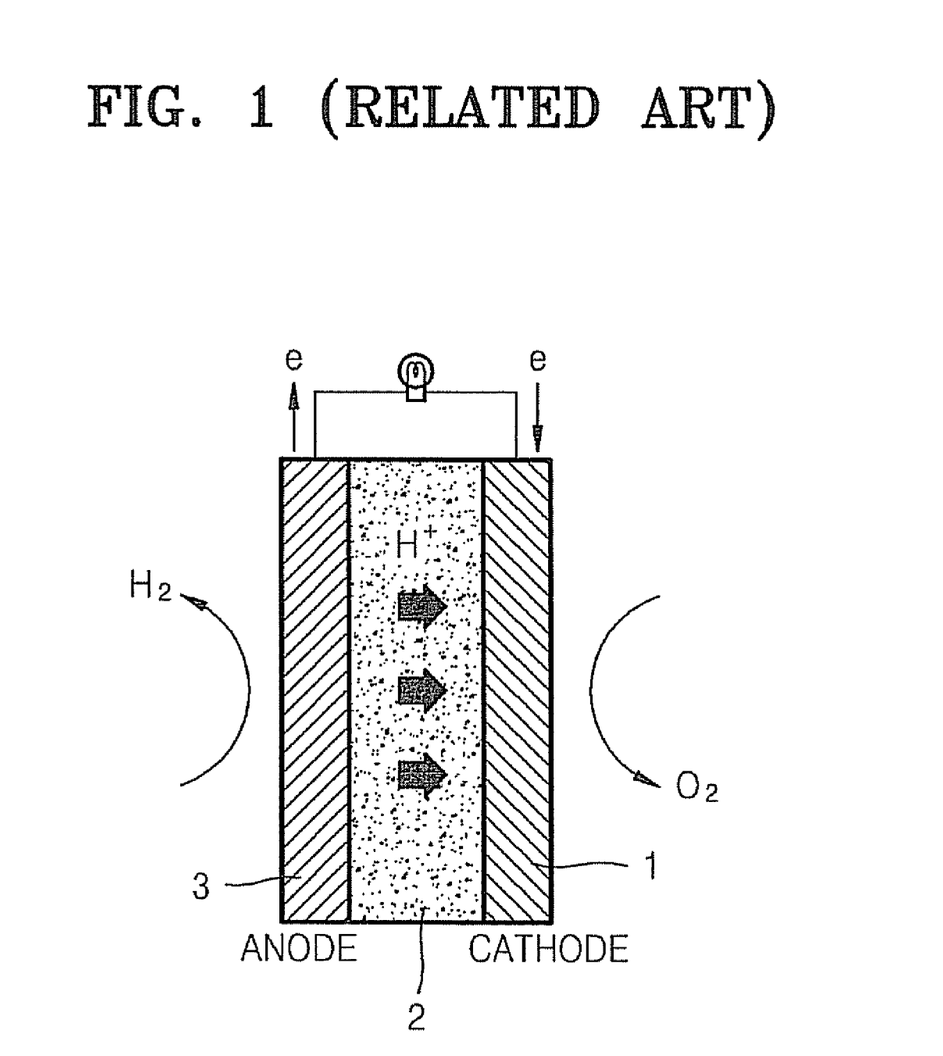
FIG. 1 is a schematic drawing illustrating a structure of a conventional fuel cell.

A fuel cell is an electricity generator that changes chemical energy of a fuel into electrical energy through a chemical reaction. A fuel cell can continuously generate electricity as long as the fuel is supplied. FIG. 1 is a schematic drawing illustrating the energy transformation structure of a conventional fuel cell. Referring to FIG. 1, when air that includes oxygen is supplied to a cathode 1 and a fuel containing hydrogen is supplied to an anode 3, electricity is generated by a reverse reaction of water electrolysis through an electrolyte membrane 2. However, the electricity generated by a unit cell does not produce sufficient voltage to be used individually. Therefore, electricity is generated by a stack in which a plurality of unit cells is connected in series.

Figure 2:
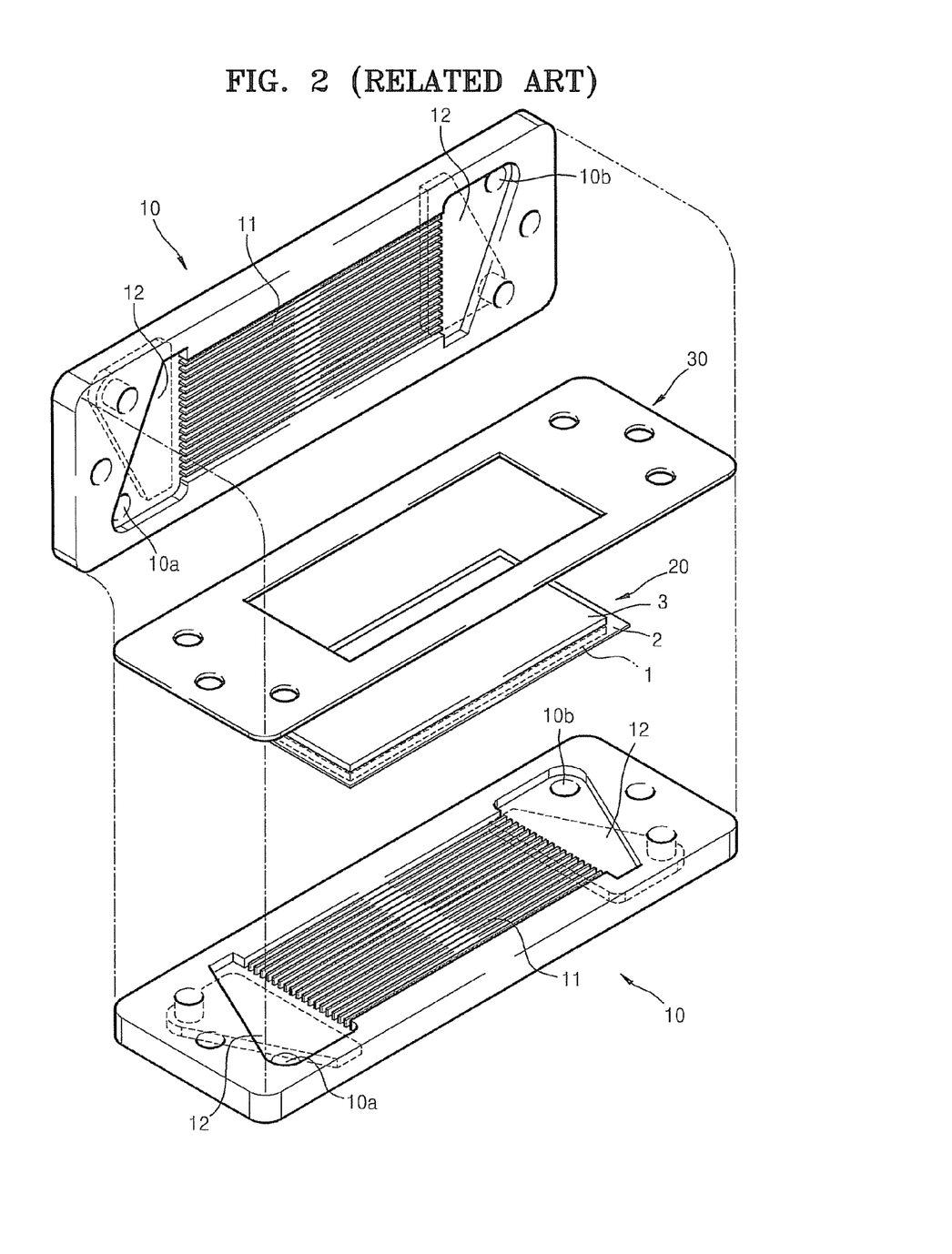
FIG. 2 is an exploded perspective view illustrating a structure of a conventional unit cell.

FIG. 2 is an exploded perspective view illustrating a structure of a conventional unit cell mounted in a stack. Referring to FIG. 2, the unit cell in a stack has a structure in which electrodes 1 and 3 and an electrolyte membrane 2 are located between a pair of bipolar plates 10. Reaction flow channels 11, through which hydrogen or oxygen to be supplied to the electrodes 1 and 3 flows, are formed in both sides of each bipolar plate 10. Hydrogen and oxygen are externally supplied to the electrodes 1 and 3 through the reaction flow channels 11. The flow channel plate 10 is called a bipolar plate as the flow channels are respectively formed on both sides of the flow channel plate 10. Repeated stacking of unit cells results in the forming of a stack. Here, a membrane electrode assembly (MEA) 20 includes the cathode and anode electrodes 1 and 3 and the electrolyte membrane 2. A gasket 30 seals an inner space of the unit cell so that hydrogen and oxygen cannot leak outside.

The bipolar plate 10 on which flow channels are formed in both sides thereof is mainly formed of graphite. In such case, there is a high possibility that the bipolar plate 10 can be damaged due to its brittleness when stress is applied to the bipolar plate 10 for a period of time. To solve this problem, the bipolar plate 10 is formed of a metal. However, when the bipolar plate 10 is formed of a metal, there is a handling problem due to the heavy weight of the resultant stack. In order to form flow channels in both sides of the bipolar plate 10, the bipolar plate 10 formed of graphite or a metal the bipolar plate 10 must have a thickness of at least 1 mm; and when a plurality of bipolar plates 10 are stacked, the volume of the stack is large. Also, if the bipolar plate 10 is formed of a metal and used for a period of time, current collection efficiency is reduced due to corrosion of the metal bipolar plate 10. To prevent the decrease in current collection efficiency, it is effective to coat Au on electrical paths. However, in when the electrical paths are coated with Au, the entire bipolar plate 10 must be coated with Au since the bipolar plate 10 itself is an electrical conductor acting as an electrical path. Receiving spaces 12 formed in the bipolar plates 10 are connected to an inlet 10$a$ and an outlet 10$b$ of the bipolar plates 10 so that the oxidizer or fuel can enter and leave the reaction flow channels 11 and contact the cathode 1 and the anode 3 of the MEA 20.

Accordingly, there is a need to develop a fuel cell stack structure in which a stack can be formed having a simple configuration.

SUMMARY OF THE INVENTION

Aspects of the present invention provide a fuel cell stack structure that can induce smooth current collection and liquid or gas flow without using a heavy bipolar plate that is formed of graphite or a metal and is accordingly difficult to manufacture.

According to aspects of the present invention, there is provided a fuel cell stack structure comprising: a membrane and electrode assembly (MEA) in which an electrolyte membrane is disposed between a cathode electrode and an anode electrode; a current collector dispose in the MEA to form an electrical path with an adjacent MEA; and a non-conductive separation plate disposed between the MEA and the adjacent MEA, the non-conductive separation plate forming flow channels to supply a liquid or gas to the cathode electrode and the anode electrode.

According to aspects of the present invention, the non-conductive separation plate is a thin film disposed between the MEAs and has a corrugated shape on both sides thereof to supply the liquid or gas to the cathode electrode and the anode electrode using the corrugated shape as flow channels.

According to aspects of the present invention, the non-conductive separation plate is disposed between adjacent MEAs and flow channel pattern units formed to protrude from the cathode electrode and the anode electrode adjacent to the non-conductive separation plate to supply the liquid or gas to the cathode electrode and the anode electrode through flow channels formed by the flow channel pattern units and the non-conductive separation plate.

According to aspects of the present invention, the current collector may comprise a non-conductive supporting plate and a plurality of conductive collectors formed on the non-conductive supporting plate.

According to aspects of the present invention, the cathode electrode and the anode electrode of the MEA each may comprise catalyst layers and diffusion layers, and the current collector may be located between the electrolyte membrane and the catalyst or between the catalyst and the diffusion layer.

According to aspects of the present invention, the non-conductive separation plate may be formed of a non-conductive polymer.

According to aspects of the present invention, the liquid or gas supplying to the anode electrode may be at least one selected from the group consisting of methanol, ethanol, formic acid, hydrogen compound aqueous solution, and hydrogen.

According to aspects of the present invention, the non-conductive supporting plate may be formed of a material selected from the group consisting of polyimide, polyethylene, polypropylene, and polyvinylchloride.

According to aspects of the present invention, the current collector may be a flexible printed circuit board (FPCB) in which the non-conductive supporting plate and the collectors are formed in one unit.

According to aspects of the present invention, the current collector may be formed of a material selected from the group consisting of Ag, Au, Al, Ni, Cu, Pt, Ti, Mn, Zn, Fe, Sn, and an alloy of these metals.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
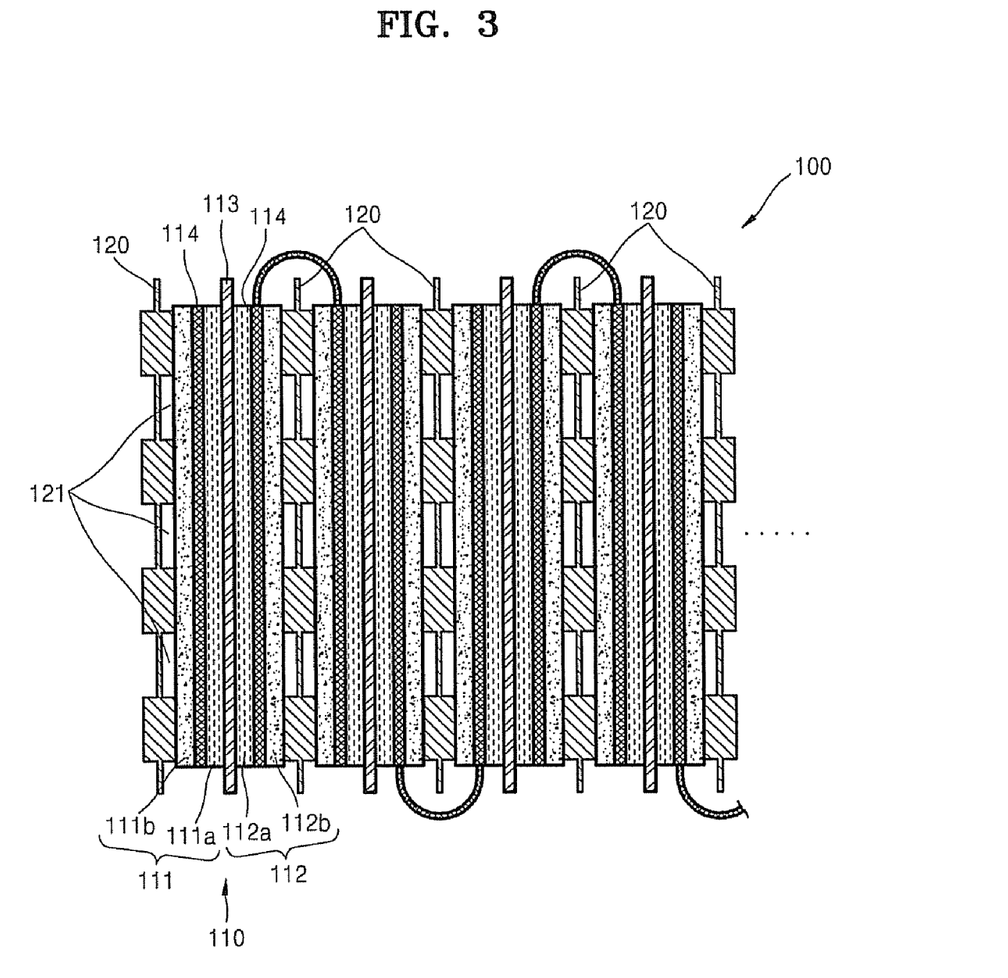
FIG. 3 is a cross-sectional view illustrating a fuel cell stack structure according to aspects of the present invention.

FIG. 3 is a cross-sectional view illustrating a fuel cell stack structure 100 according to aspects of the present invention. Referring to FIG. 3, the fuel cell stack structure 100 includes a plurality of membrane electrode assemblies (MEAs) 110, in which electricity generating reactions occur, are stacked and connected in series. In the related art, the bipolar plates 10 (FIG. 2) are installed between every MEA 110 to form flow channels to supply fuel and oxygen to the cathode and anode electrodes 1 and 3 and, at the same time, to form electrical paths through which current flows through each of the MEAs 110. However, an aspect of the present invention is that the structure is light weight and simple compared to the related art.

Current collectors 114 are installed in cathode and anode electrodes 111 and 112 of each of the MEAs 110 to electrically connect the adjacent MEAs 110. That is, a current collector 114 is installed in each of the cathode electrodes 111 and the anode electrodes 112 of each MEA 110 and the current collectors 114 of adjacent MEAs 110 are electrically connected so that electrical paths can be smoothly formed without the conventional conductive bipolar plates 10. The current collector 114 can be, for example, a metal mesh member, however the current collector 114 is not limited thereto. That is, any current collector 114 used to electrically connect adjacent MEAs 110 that allows current to flow can be applied according to aspects of the present invention. In other words, the conventional conductive bipolar plates (10 in FIG. 2) are serially connected to all of the metal mesh shaped current collectors 114 installed in each of the cathode electrodes 111 and the anode electrodes 112 of the MEAs 110. Here, the current collector 114 is disposed between catalyst layers 111a and 112a and diffusion layers 111b and 112b of each cathode electrode 111 and the anode electrode 112, respectively, but the current collector 114 can be disposed independently between an electrolyte membrane 113 and the catalyst layers 111a and 112a of each cathode 111 and each anode 112, or can be disposed outside the diffusion layers 111b and 112b of each cathode 111 and each anode 112.

According to aspects of the present invention, non-conductive separation plates 120 installed between the MEAs 110 form flow channels 121 to supply a liquid or gas to the cathode electrodes 111 and the anode electrodes 112. The non-conductive separation plates 120 can be formed in, for example, a thin plate formed of a non-conductive polymer. The flow channels 121 are formed on both surfaces of a main body, and a liquid or gas, such as fuel or oxygen, are supplied to the cathode electrodes 111 and the anode electrodes 112 through the flow channels 121. Thus, an electricity generating reaction can continuously occur in the MEAs 110. Any electrical current that is produced in each of the MEAs 110 flows to the adjacent MEA 110 through the current collectors 114 connected in series. Although the MEAs 110 are illustrated and described as being connected in series, the MEAs 110 may be connected in parallel or in series and parallel.

As described above, the conventional bipolar plates that are heavy, brittle, and difficult to manufacture are replaced by the current collectors 114 and the non-conductive separation plates 120 to thereby simplify the fuel cell stack structure and to enable easy handling. Also, when the efficiency of electrical flow is in danger of decreasing due to the corrosion of components in the fuel cell stack structure according to aspects of the present invention, the efficiency of electrical flow can be maintained by coating only the current collectors 114 without coating the entire bipolar plates 10 (of FIG. 2) like in the related art, thereby reducing maintenance costs.

The current collector 114 can be a flexible printed circuit board (FPCB) in which the current collector 114 is formed in one unit on a flexible non-conductive supporting plate in addition to the metal mesh membrane as described above. The FPCB can be formed such that the current collector 114 is formed of Ag, Au, Al, Ni, Cu, Pt, Ti, Mn, Zn, Fe, Sn, or an alloy of these metals and is formed in one unit on a non-conductive supporting plate formed of polyimide, polyethylene, polypropylene, or polyvinylchloride. The FPCB collects and conveys currents similar to the metal mesh membrane.

Figure 4:
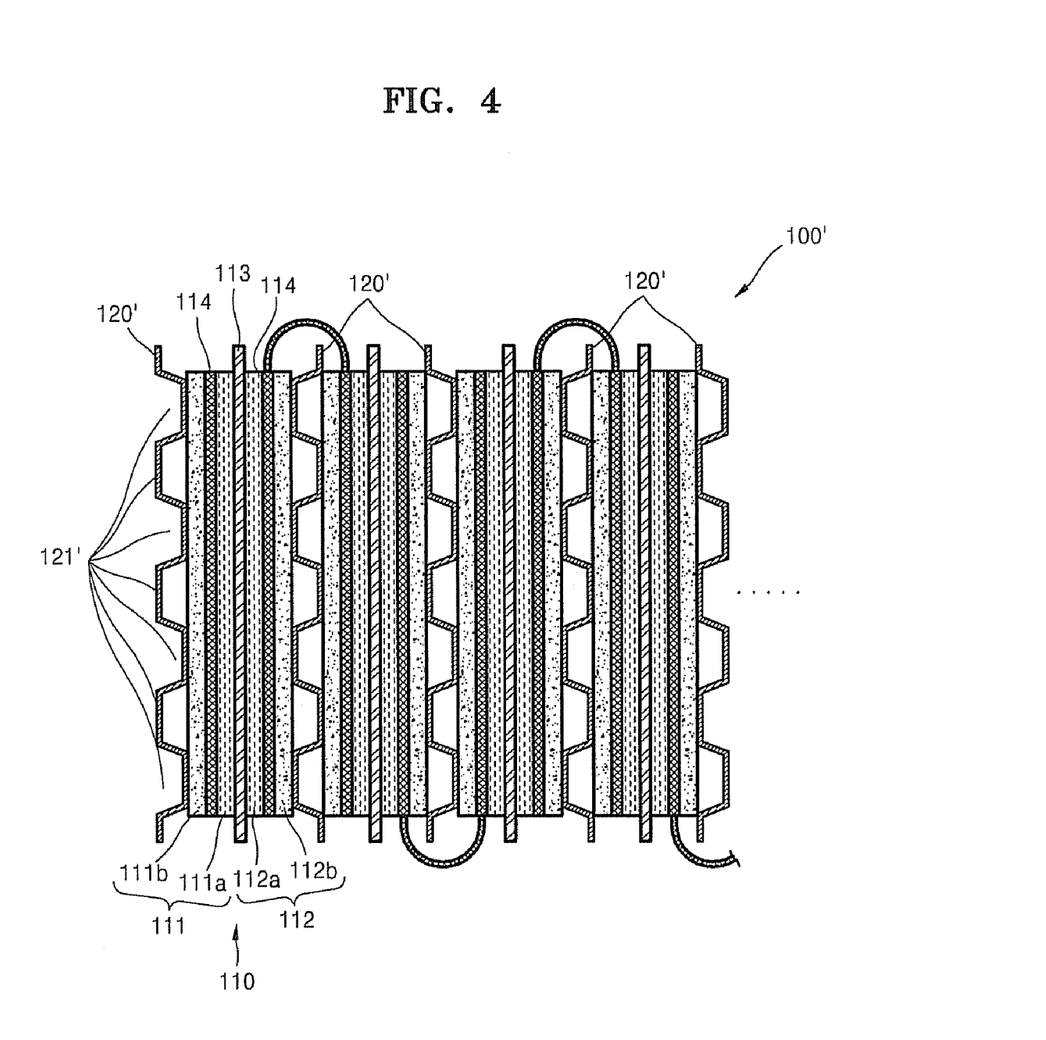
FIGS. 4 and 5 are respectively a cross-sectional view and an exploded perspective view illustrating a fuel cell stack structure according to aspects of the present invention.
Figure 5:
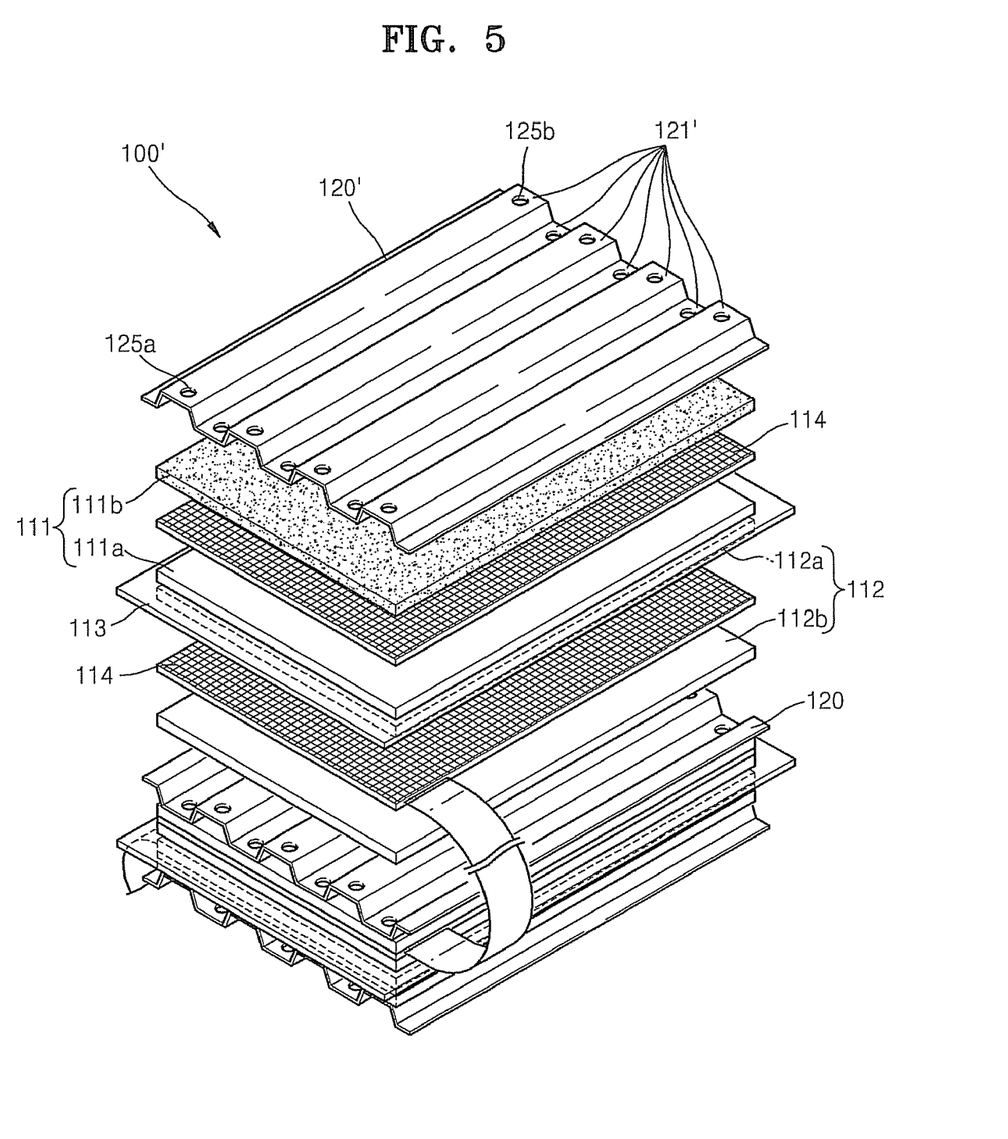

FIG. 4 illustrates a cross-sectional view of and FIG. 5 illustrates an exploded perspective view of a fuel cell stack structure 100' according to aspects of the present invention. The fuel cell stack structure 100' also has a structure in which current collectors 114 installed in MEAs 110 to electrically connect the adjacent MEAs 110 and non-conductive separation plates 120' installed between the MEAs 110 to provide flow channels to supply a liquid or gas instead of the conventional bipolar plates 10.

The non-conductive separation plates 120' can be formed in, for example, a thin plate formed of a polymer material, and channels 121' are defined by a corrugated shape of the non-conductive separation plates 120' formed by a press processing. The non-conductive separation plates 120' are disposed between adjacent MEAs 110. In the conventional bipolar plate 10, flow channels for supplying fuel and oxygen are formed by grooving both sides of the bipolar plate 10, and thus, a certain thickness is required so as to form the grooves on both sides of the bipolar plate 10 and a wall therebetween. However, according to aspects of the present invention, the channels 121' as defined by the corrugated shape of the non-conductive separation plates 120' are formed by press processing the non-conductive separation plates 120' and the channels 121' allow the liquid or gas to flow therethrough and contact the diffusion layers 111b and 112b. Although not shown, gaskets to prevent leaking of a liquid or gas are installed in the edges (or about the periphery of the MEAs 110) between the non-conductive separation plates 120' and the MEAs 110. Further, the channels 121' each include an inlet 125a and an outlet 125b through which fuel or oxidizer flows respectively into and out of each channel 121'.

In the fuel cell stack structure 100' having the above-described structure, fuel and oxygen are supplied through the channels 121' as defined by the corrugated shape of the non-conductive separation plates 120'. That is, the supply of fuel and oxygen that flows through the channels 121' as defined by the corrugated shape contacts the cathode electrodes 111 and the anode electrodes 112. Therefore, the electricity generation reaction in the MEAs 110 can be continuously performed. Any electrical current that is produced in each of the MEAs 110 flows to an adjacent MEA 110 through the current collectors 114. The MEAs 110 are connected in series; however, the MEAs 110 may be connected in parallel or in series and parallel.

As described above, the conventional bipolar plates 10 that are heavy, brittle, and difficult to manufacture are replaced by the current collectors 114 and the non-conductive separation plates 120', thereby simplifying the fuel cell stack structure and enabling easy handling. Also, when the efficiency of electrical flow may be decreased due to the corrosion of components in the fuel cell stack structure according to aspects of the present invention, the efficiency of electrical flow can be maintained by coating only the current collectors 114 without coating all of the bipolar plates 10 of FIG. 2 as in the related art, thereby reducing maintenance costs.

The current collector 114 can be a flexible printed circuit board (FPCB) in which the current collector 114 is formed in one unit on a flexible non-conductive supporting plate in addition to or independent of the metal mesh membrane as described above. The FPCB can be formed such that the current collector 114 is formed of Ag, Au, Al, Ni, Cu, Pt, Ti, Mn, Zn, Fe, Sn, or an alloy of these metals and is formed in one unit on a non-conductive supporting plate formed of polyimide, polyethylene, polypropylene, or polyvinylchloride. The FPCB collects and conveys currents similar to the metal mesh membrane.

Figure 6:
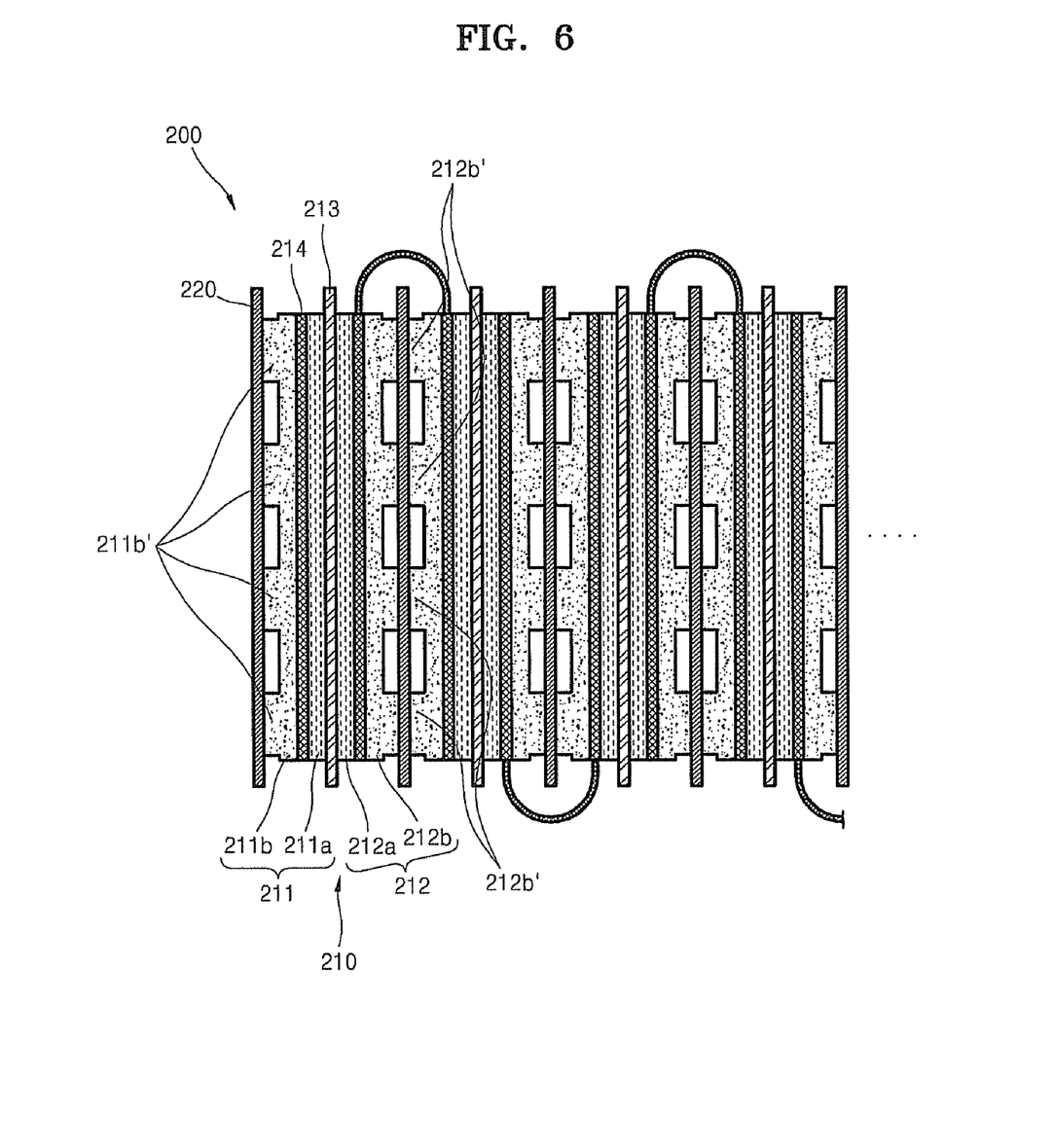
FIG. 6 is a cross-sectional view illustrating a fuel cell stack structure according to aspects of the present invention.

FIG. 6 is a cross-sectional view illustrating a fuel cell stack structure 200 according to aspects of the present invention. The fuel cell stack structure 200, like the fuel cell stack structure 100 illustrated in FIG. 3, also has a structure in which current collectors 214 disposed in MEAs 210 facilitate electrical connection between adjacent MEAs 110 and non-conductive separation plates 220 disposed between adjacent MEAs 210 provide flow channels to supply a liquid or gas instead of the conventional bipolar plates 10. However, the non-conductive separation plates 220 according to aspects of the present invention are not formed in the corrugated shape structure but formed in a flat panel shape. Instead, flow channel pattern units 211b' and 212b' are formed in diffusion layers 211b and 212b, which are outermost parts of cathode and anode electrodes 211 and 212. That is, while a flat panel is employed for the non-conductive separation plates 220, spaces formed by the non-conductive separation plates 220 and the flow channel pattern units 211b' and 212b' form channels through which a liquid or gas may flow. The flow channel pattern units 211b' and 212b' are formed in the diffusion layers 211b and 212b that contact the non-conductive separation plates 220. An electrolyte membrane 213 is disposed between the cathode 211 and the anode 212 in the MEA 210. The cathode electrode 211 and the anode electrode 212 respectively include catalyst layers 211a and 212a.

A fuel cell stack structure 200 having the above-described structure can also replace the conventional bipolar plate 10 of FIG. 2, and has at least similar advantages as the fuel cell stack structure 100 of FIG. 3. The current collector 214 may also be an FPCB.

Figure 7:
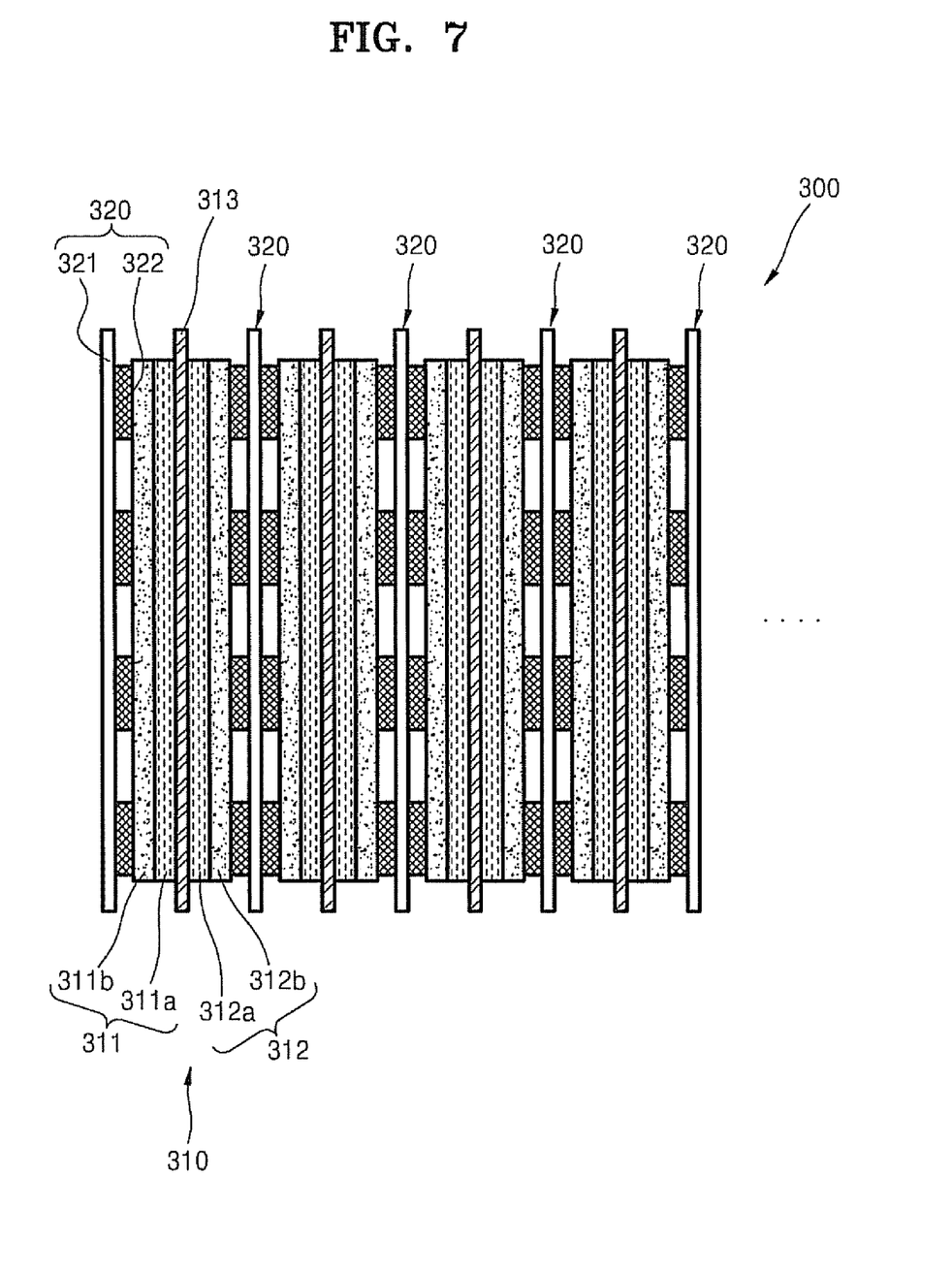
FIG. 7 is a cross-sectional view illustrating a fuel cell stack structure according to aspects of the present invention.

FIG. 7 is a cross-sectional view illustrating a fuel cell stack structure 300 according to aspects of the present invention. In the fuel cell stack structure 300, current collectors 320 are formed between adjacent MEAs 310. However, non-conductive supporting plates 321 of the current collectors 320 support and insulate adjacent MEAs 310. According to aspects of the present invention, each of the current collectors 320 has a structure in which a plurality of collectors 322 on which an anti-corrosion agent, such as Au, is coated is disposed on a non-conductive supporting plate 321 formed of polyimide. The current collectors 320 can also be an FPCB as described above. In this way, the non-conductive supporting plates 321 separate and insulate adjacent MEAs and the plurality of collectors 322 simultaneously form electrical paths and flow channels. That is, the collectors 322 are electrically connected to the current collectors of adjacent MEAs 310 by conductive lines formed on the non-conductive supporting plates 321, thereby forming electrical paths. Spaces formed by the contact between the collectors 322 protruding from the non-conductive supporting plates 321 and diffusion layers 311b and 312b of cathode and anode electrodes 311 and 312 are used as channels for moving a liquid or gas.

According to aspects of the present invention, the fuel cell stack structures of FIGS. 3, 4, and 6 may be applied to a direct methanol fuel cell (DMFC) system that uses methanol as a fuel, or to any fuel cell system that uses ethanol, formic acid, hydrogen compound aqueous solution, hydrogen, or extracted hydrogen as a fuel. According to aspects of the present invention, the current collectors 320 can electrically connect adjacent fuel cells and form channels through which fuel and oxygen are supplied without forming additional separation plates. An electrolyte membrane 313 is disposed between the cathode 311 and the anode 312 of the MEA 310. Catalyst layers 311a and 312a are respectively formed in the cathode electrode 311 and the anode electrode 312. The cathode electrode 311 and the anode electrode 312 also respectively include diffusion layers 311b and 312b.

According to the fuel cell stack structures described above, a stack having a lightweight and simple structure can be realized by effectively replacing the conventional bipolar plates.

The fuel cell stack structure according to aspects of the present invention has the following advantages and/or other advantages: first, a thin non-conductive separation plate and a current collector installed in an MEA, simplify the structure of the fuel cell stack and decrease the weight thereof to thereby enable easy handling of the fuel cell stack. Second, electrical connection efficiency in light of corrosion can be maintained by coating only the current collector unlike in the related art in which all of the bipolar plate is coated. Therefore, costs for preventing anti-corrosion are reduced.

Although a few embodiments of the present invention have been shown and described, it would be appreciated by those skilled in the art that changes may be made in this embodi-

What is claimed is:

1. A fuel cell stack, comprising:
a membrane electrode assembly (MEA) having an electrolyte membrane disposed between a cathode electrode and an anode electrode;
current collectors respectively disposed in the cathode electrode and the anode electrode of the MEA, wherein each current collector is electrically connected to a current collector of an adjacent MEA such that electrical paths between each current collector and the current collector of the adjacent MEA are formed;
a non-conductive separation plate disposed between the MEA and the adjacent MEA, such that flow channels are formed in parallel, on opposing sides of the non-conductive separation plate, to supply fluids to the cathode electrode of the MEA and an anode electrode of the adjacent MEA, and
diffusion layers, each diffusion layer being between one of the current collectors and the non-conductive separation plate, and each current collector being separated from the non-conductive separation plate by a respective diffusion layer.

2. The fuel cell stack of claim 1, wherein the non-conductive separation plate is formed of a non-conductive polymer.

3. The fuel cell stack of claim 1, wherein the fluid supplied to the anode electrode is in a liquid state or a gaseous state and includes at least one of methanol, ethanol, formic acid, a hydrogen compound aqueous solution, and hydrogen.

4. The fuel cell stack of claim 1, wherein the cathode electrode and the anode electrode each include a catalyst layer, and the current collectors are disposed in the cathode electrode and the anode electrode independently between the electrolyte membrane and the catalyst layer or between the catalyst layer and the diffusion layer.

5. The fuel cell stack of claim 1, wherein the current collector is a metal mesh membrane.

6. The fuel cell stack of claim 1, wherein the current collector is coated with an anti-corrosion agent.

7. The fuel cell stack of claim 1, wherein the non-conductive separation plate is a thin plate and the flow channels are defined by a corrugated shape of the non-conductive separation plate formed by a press processing.

8. The fuel cell stack of claim 1, wherein the current collector is a flexible printed circuit board (FPCB) having a structure of a conductive material that is formed in one unit.

9. The fuel stack of claim 8, wherein the conductive material includes at least one of Ag, Au, Al, Ni, Cu, Pt, Ti, Mn, Zn, Fe, Sn, and alloys thereof.

10. The fuel cell stack of claim 8, wherein the non-conductive supporting plate includes at least one of polyimide, polyethylene, polypropylene, and polyvinylchloride.

11. The fuel cell stack of claim 1, wherein each current collector is electrically connected to a current collector of an adjacent MEA by a strip that extends from an edge of the current collector to an edge of the current collector of the adjacent MEA.

* * * * *